United States Patent Office 3,391,012
Patented July 2, 1968

3,391,012
METAL TREATING COMPOSITIONS
AND PROCESSES
Abraham J. Mitchell, Stratford, and Paul R. Jarvi, Orange, Conn., assignors to The Mitchell-Bradford Chemical Co., Milford, Conn., a corporation of Connecticut
No Drawing. Continuation-in-part of application Ser. No. 335,393, Jan. 2, 1964. This application Jan. 31, 1967, Ser. No. 612,823
8 Claims. (Cl. 106—287)

ABSTRACT OF THE DISCLOSURE

An improved composition for the electroless blackening of aluminum comprising an acidic water solution of chloride ions, selected from alkali metal chlorides, ammonium chlorides and hydrogen, ions of a metal falling below aluminum in the electromotive series, a sulfur-bearing compound capable of forming a black reaction product with said metal ions, a molybdate compound, and a water-soluble organic hydroxy acid reducing agent or salt thereof which is reactive with the black deposit on the aluminum to render it more water-insoluble and stable.

---

This application is a continuation-in-part of our earlier copending application, Ser. No. 335,393, filed on Jan. 2, 1964, now United States Patent No. 3,314,811.

Our earlier application relates to novel compositions for the electroless blackening of aluminum and alloys thereof, said composition comprising a mixture of water-soluble compounds which are reactive with aluminum to render it receptive to the deposit of blackening compounds, said reactive compounds comprising a chloride and at least one salt of a metal falling below aluminum in the electromotive series, and a mixture of water-soluble blackening compounds comprising at least one sulfur-bearing compound capable of forming a black reaction product with said metal, and a molybate compound.

When such compositions are dissolved in water and the pH is regulated, if necessary, to below about 6.5, they form a dark black surface deposit on aluminum by mere immersion without the necessity of applying electrolysis or employing current, rectifiers, anodes or any of the other burdens of the conventional electroplating processes.

While such compositions represent a substantial advance of the art, we found that although the blackened deposit formed on the aluminum surface is quite intense and water-insoluble, a small amount of the deposit representing some portion of the black reaction product is water-soluble and leaches out into the blackening bath and into the rinsing baths and onto the hands of the personnel making contact with the blackened piece. Although the blackened piece can be rendered clean to the touch by the application of the protective coating taught by our earlier application, the leaching of the water-soluble portion of the black deposit represented a disadvantage with which the present invention is concerned.

It is an object of the present invention to provide an improved aluminum blackening composition which may be applied at room temperatures or any higher or more convenient temperatures by conventional immersion techniques and in the absence of applied current to form on the aluminum surface black coatings which have increased water-insolubility and do not leach out into the rinsing bath or onto the hands during handling.

It is another object of this invention to provide a rapid and inexpensive process for applying black coatings to aluminum which have increased water-insolubility.

These and other objects and advantages are accomplished by the present invention as will be clear to those skilled in the art in the light of the following description.

The essence of the present invention resides in the discovery that the addition of a water-soluble organic reducing agent such as a water-soluble organic hydroxy acid or salt thereof to the compositions of our parent application causes the deposit of a more water-insoluble black coating on aluminum than is the case when the hydroxy acid or salt is omitted.

It is not at all clear why or how this novel result is achieved although it is clear that the organic reducing agent reacts in some manner to give rise to a more water-insoluble black deposit and prevents the formation of that portion of the black deposit which otherwise would be water-soluble. The reaction clearly involves something more than simple reduction since the conventional inorganic reducing agents are completely ineffective in producing this result as evidenced by the fact that the basic blackening composition itself contains strong inorganic reducing agents such as sodum thiocyanate and is acidic. However, it is possible that the present organic reducing agents are able to affect the blackening composition solution and/or the black deposit in some manner, for instance due to their polarity or chelating activity, so that a reducing action is able to take place where otherwise it could not. However, chelating agents which are not also reducing agents have been found to be completely ineffective.

The theory that some reducing activity occurs is strengthened by the fact that molybdenum compounds are more water-insoluble when the valence of the molybdenum is on the low end of the numerous valences which molybdenum can have. Higher valence compounds of molybdenum are more water-soluble.

The water-soluble organic reducing agents suitable for use according to the present invention are those which are water-soluble and which do not react with any of the ingredients of the blackening composition to form water-insoluble reaction products. The preferred materials are the organic hydroxy acids or salts having more than one carboxy group or salt thereof and/or more than one hydroxy group, and most preferably aliphatic compounds having a hydroxy group on the carbon atom alpha to the carboxy group. Illustrative of such most preferred compounds are tartaric acid and salts thereof such as potassium sodium tartrate, gluconic acid and salts thereof such as potassium gluconate, citric acid and salts thereof such as sodium citrate. Also suitable are the aromatic hydroxy acids such as gallic acid and its salts and related compounds, and heterocyclic hydroxy acids such as kojic acid and its salts and related compounds.

By water-soluble is meant that the major amount of the organic reducing agents must be capable of dissolving in the blackening bath at its operating temperature which ranges from at least 50° F. up to a maximum of 212° F.

It appears that the present compositions fulfill a two-fold effect in which the aluminum surface is both etched and coated with a black metallic coating, the etching step rendering the surface receptive to the deposit of black molybdenum oxides which appear to comprise molyhdic oxide and the metallic coating step forming a coating which is reactive with a sulfur-bearing compound to form the black reaction product which appears to comprise sulfides. The organic reducing agent takes part in one or both of these reactions and assists in the formation of one or more black reaction products having increased water-insolubility.

The first blackening combination in the mixture comprises a water-soluble chlorine compound which ionizes to form chloride ions which function to etch or otherwise roughen the aluminum surface, and molybdic acid or the water-soluble salts thereof which function to deposit black molybdic oxide on the roughened aluminum surface.

Suitable chlorine compounds include the alkali metal chlorides such as sodium chloride and potassium chloride, ammonium chloride, hydrochloric acid and the like water-soluble ionizable chlorides.

Suitable molybdic oxide liberating compounds are molybdic acid or hydrogen molybdate and the water-soluble salts thereof such as the alkali metal molybdates including sodium molybdate and potassium molybdate, ammonium molybdate and the like.

The second blackening combination of the mixture encompassed by the present invention comprises the water-soluble salt of a metal below aluminum in the electromotive series, and a water-soluble sulfur-bearing compound. The metal salt ionizes in solution to form metal cations which deposit in an acid medium on the aluminum surface to form a surface film which appears to be receptive to or reactive to form black metal surfur compounds or complexes.

Metal salts found suitable for treating the aluminum surface to render it receptive to black metal sulfide deposits include the salts as broadly defined and more specifically includes the sulfates, dichromates, nitrates, chlorides, acetates and other water-soluble salts of metals such as nickel, chromium, cobalt, antimony, bismuth, arsenic and any of the other metals which have a lower electrode potential than aluminum and are therefore below aluminum in the electromotive series and which are therefore replaced from their salts by aluminum.

Water-soluble sulfur-bearing compounds found suitable for the formation of black metal sulfur reaction products in an acid medium include sulfides, thiocyanates, thiosulfates, thioureas, 2-mercaptobenzothiazole, benzothiazyl disulfide, 2-mercaptoimidazoline and the like, and including most preferably sodium thiocyanate, sodium sulfide, sodium hyposulfate and the like. Unsuitable are sulfur-bearing compounds which ionize to form sulfate ions or other stable unreactive ions in which the sulfur is bonded to another atom and is unavailable for the blackening reaction. The sulfur compound must be capable of liberating available sulfur or reactive sulfur-containing ions in aqueous solution.

According to the present invention, an aqueous blackening composition is formulated so as to include both blackening compositions heretofore set out. It has been found that when a single blackening composition is so formulated it provides a bath which blackens aluminum more deeply and more evenly and smoothly than is possible using either of the other compositions alone. From these standpoints the behavior of the combination aqueous blackening composition is synergistic.

The present blackening compositions are used at a pH which is no higher than about 6.5 and which is preferably in the area of about 4. The temperature of the aqueous blackening bath is within the range of from 50° F. to 212° F. and preferably in the range of from about 150° F. to 160° F.

According to the preferred embodiment of the present invention, the amount of chloride ions in the blackening bath is maintained rather low in order to avoid excessive etching of the aluminum pieces being blackened. If a high chloride ion content is used, the duration of immersion must be reduced and controlled more closely and/or the temperature of the bath must be reduced. However, it has been found preferable to reduce the chloride content to a point within the range of from about 2% up to a maximum of about 60% and preferably within the range of from 3% to 10% by weight based upon the total weight of the dry blackening composition. This is made possible by adding to the composition a water-soluble filler or diluent compound which is unreactive with the other components in the dry mix and which liberates stable ions in solution which do not interfere with the blackening reaction. Suitable compounds are boric acid and water-soluble borates, sulfates, nitrates or other salts of acids which do not precipitate any of the ions in the blackening bath. These filler compounds may comprise from about 20% by weight up to about 80% by weight of the weight of the dry composition and preferably are in the range of from about 50% to 70% by weight.

The filler compound dilutes the effect of the blackening composition so that it is easier to obtain a more uniform concentration of the reactive components in solution and it is possible to add more of the blackening composition to the bath during use without suddenly increasing the concentration of the reactive ingredients and damaging the parts being blackened.

The blackening compositions contain the following ingredients in the following proportions:

| Ingredient | Range in percent by Weight | |
| --- | --- | --- |
| | Broad | Preferred |
| Molybdic acid or salt | 2-25 | 3-10 |
| Metal salt | 3-40 | 3-20 |
| Water-soluble chloride | 2-60 | 3-10 |
| Sulfur-bearing compound | 0.5-20 | 1-5 |
| Filler compound | 0-80 | 50-70 |
| Organic reducing agent | 1-50 | 3-10 |
| Fluorine-bearing compound | 0-20 | 5-15 |

The following example is illustrative of a preferred composition for use according to the present invention. However, the specific ingredients and proportions are set forth as illustrative and should not be considered limitative, possible variations being clear to those skilled in the art in the light of the disclosure set out hereinbefore in connection with the previous formulation.

Example 1

| Ingredients: | Percent by weight |
| --- | --- |
| Molybdic acid | 10 |
| Cobalt sulfate | 10 |
| Potassium sodium tartrate | 6 |
| Ammonium chloride | 6 |
| Sodium thiocyanate | 4 |
| Boric acid | 43.9 |
| Ammonium silico fluoride | 20 |
| Wetting agent | 0.1 |
| | 100.0 |

These ingredients are dissolved in water in a concentration ranging from about 1 ounce per gallon up to about 3 or more pounds per gallon depending upon the reseults desired. In most cases it is preferred to use a concentration in the area of from 2 to 10 ounces per gallon and most preferably about 6 ounces per gallon of water since this amount produces a pH of about 4.3 which is a good operating pH.

The fluoride ingredient is found to cooperate with the chloride in etching the aluminum surface. Similar results are obtained through the use of soluble fluoborates, fluorides and bifluorides.

A blackening bath prepared in this manner is preferably heated to a temperature of between about 120° F. and 180° F. and most preferably between 150° F. and 160° F. for use, although it has been found effective in accomplishing the desired result at temperatures as low as about 50° F. and as high as its boiling temperature which is somewhat in excess of 212° F. Low temperatures require longer immersion periods while high temperatures result in deposition too rapidly and quite unevenly.

The aluminum pieces are immersed in the blackening composition for a period of from 1 to 30 minutes depending upon the specific acidity of the solution and its temerature. Generally an immersion time of from 10 to 15 minutes is sufficient to form a dark black deposit which is smooth and even and which is firmly anchored to the aluminum surface. The aluminum is removed from the composition and washed or rinsed.

In cases where it is desired to further treat the aluminum to provide it with an oxidation-resisting, corrosion-resistant coating, the blackened aluminum pieces are immersed in any conventional wax, oil or resin composition to deposit over the blackened surface a protective coating or shield as taught in our copending application.

The phrase "blackening composition" as used herein and in the appended claims is intended to include compositions useful for applying jet black or off-black coatings, as desired, including those in which the deposit is rather light or thin and which appear to have a gray color due partly to the show-through of the underlying aluminum.

While the compositions of the present invention have been discussed primarily in connection with their use in the blackening of aluminum and aluminum alloy metals, it should be understood that the present compositions are also useful for the blackening of other metals such as iron, stainless steel, brass, copper, zinc, titanium, magnesium and the like. The present compositions are particularly adapted for the coloration of aluminum in view of the many problems encountered in connection with the coloration of aluminum and the provision of aluminum with a coating receptive to protective outed coatings of oil or wax.

Variations and modifications may be made within the scope of the claims and portions of the improvements may be used without others.

We claim:

1. In the method of blackening aluminum which comprises the steps of preparing a blackening composition by dissolving in water from about 1 ounce to about 3 pounds per gallon of a mixture of compounds which are reactive with aluminum to render it receptive to the deposit of blackening compounds comprising from 2 percent to 60 percent by weight of a water-soluble chloride selected from the group consisting of alkali metal chlorides, ammonium chloride and hydrogen chloride and from 3 percent to 40 percent by weight of a water-soluble salt of a metal falling below aluminum in the electromotive series, and a mixture of blackening compounds comprising from 0.5 percent to 20 percent by weight of a water-soluble sulfur-bearing compound capable of forming a black metal-sulfur reaction product upon reaction with said metal falling below aluminum in the electromotive series, and from 2 percent to 25 percent by weight of a water-soluble molydbate, maintaining the pH of the solution below about 6.5, maintaining the temperature of the solution within the range of from about 50° F. to about 212° F., immersing the aluminum into the blackening composition for a period of from 1 to 30 minutes, and removing the blackened aluminum, the improvement which comprises adding to the solution from 1 percent to 50 percent by weight of a water-soluble organic reducing agent selected from the group consisting of organic hydroxy acids and salts thereof, whereby the blackened deposit formed on the aluminum has increased water-insolubility and will not leach from the aluminum during rinsing or handling.

2. The method according to claim 1 in which the reducing agent is an aliphatic compound having a plurality of groups selected from the group consisting of hydroxyl groups and carboxyl groups and salts of carboxyl groups, and has at least one hydroxyl group on a carbon atom alpha to at least one carboxyl group or salt thereof.

3. The method according to claim 1 in which the chloride content is maintained between about 3 percent and 10 percent by weight and from about 50 percent to 70 percent by weight of a water-soluble filler compound is added, said compound being one which will not react with any of the ingredients of the composition to form a water-insoluble reaction product.

4. The method according to claim 3 in which the composition comprises the following ingredients and proportions:

| Ingredients: | Percent by weight |
| --- | --- |
| Chloride | 3 to 10 |
| Metal salt | 3 to 20 |
| Sulfur compound | 1 to 5 |
| Molybdate | 3 to 10 |
| Reducing agent | 3 to 10 |
| Filler compound | 50 to 70 |
| Fluorine-bearing compound | 5 to 15 | said fluorine-bearing compound being selected from the group consisting of water-soluble fluoborates, fluorides and bifluorides, and said metal salt being selected from the group consisting of sulfates, dichromates, nitrates, chlorides and acetates.

5. A blackening composition useful for the blackening of aluminum surfaces when dissolved in an aqueous solution in an amount ranging from about 1 ounce to about 3 pounds per gallon, said composition comprising a mixture of compounds which are reactive with aluminum to render it receptive to the deposit of blackening compounds and which comprise from 2 percent to 60 percent by weight of a water-soluble chloride selected from the group consisting of alkali metal chlorides, ammonium chloride and hydrogen chloride and from 3 percent to 40 percent by weight of a water-soluble salt of a metal falling below aluminum in the electromotive series, and a mixture of blackening compounds comprising from 0.5 percent to 20 percent by weight of a water-soluble sulfur-bearing compound capable of forming a black metal-sulfur reaction product upon reaction with said metal falling below aluminum in the electromotive series, from 2 percent to 25 percent by weight of a water-soluble molybdate and from 1 percent to 50 percent by weight of a water-soluble organic reducing agent selected from the group consisting of organic hydroxy acids and salts thereof, capable of assisting in the blackening operation to form a water-insoluble deposit on the aluminum.

6. A blackening composition according to claim 5 in which the reducing agent is an aliphatic compound having a plurality of groups selected from the group consisting of hydroxyl groups and carboxyl groups and salts of carboxyl groups, and has at least one hydroxyl group on a carbon atom alpha to at least one carboxyl group or salt thereof.

7. A blackening composition according to claim 5 in which the chloride content is maintained between about 3 percent and 10 percent by weight and from about 50 percent to 70 percent by weight of a water-soluble filler compound is added, said compound being one which will not react with any of the ingredients of the composition to form a water-soluble reaction product.

8. A blackening composition according to claim 5 in which the composition comprises the following ingredients and proportions:

| Ingredient: | Percent by weight |
| --- | --- |
| Chloride | 3 to 10 |
| Metal salt | 3 to 20 |
| Sulfur compound | 1 to 5 |
| Molybdate | 3 to 10 |
| Reducing agent | 3 to 10 |
| Filler compound | 50 to 70 |
| Fluorine-bearing compound | 5 to 15 | said fluorine-bearing compound being selected from the group consisting of water soluble fluoborates, fluorides and bifluorides, and said metal salt being selected from the group consisting of sulfates, dichromates, nitrates, chlorides and acetates.

References Cited

UNITED STATES PATENTS

| | | | |
|---|---|---|---|
| 3,024,134 | 3/1962 | Nixon | 17—130 |
| 3,314,811 | 4/1967 | Mitchell | 106—286 |

OTHER REFERENCES

Prescott et al.: "Sequestering Agents in Aluminum Etching," October 1953, Metal Finishing, vol. 51, No. 10, pp. 65–67.

JAMES A. SEIDLECK, *Primary Examiner.*

ALEXANDER H. BRODMERKEL, *Examiner.*

T. MORRIS, *Assistant Examiner.*

UNITED STATES PATENT OFFICE
CERTIFICATE OF CORRECTION

Patent No. 3,391,012                                          July 2, 1968

Abraham J. Mitchell et al.

It is certified that error appears in the above identified patent and that said Letters Patent are hereby corrected as shown below:

Column 1, line 41, "molybate" should read -- molybdate --. Column 2, line 26, "sodum" should read -- sodium --. Column 3, line 30, "surfur" should read -- sulfur --. Column 4, line 58, "reseults" should read -- results --. Column 5, line 34, "outed" should read -- outer --. Column 6, line 61, "water-soluble" should read -- water-insoluble --.

Signed and sealed this 18th day of November 1969.

(SEAL)
Attest:

Edward M. Fletcher, Jr.                              WILLIAM E. SCHUYLER, JR.
Attesting Officer                                               Commissioner of Patents

UNITED STATES PATENT OFFICE
CERTIFICATE OF CORRECTION

Patent No. 3,391,012                            July 2, 1968

Abraham J. Mitchell et al.

It is certified that error appears in the above identified patent and that said Letters Patent are hereby corrected as shown below:

Column 1, line 41, "molybate" should read -- molybdate --. Column 2, line 26, "sodum" should read -- sodium --. Column 3, line 30, "surfur" should read -- sulfur --. Column 4, line 58, "reseults" should read -- results --. Column 5, line 34, "outed" should read -- outer --. Column 6, line 61, "water-soluble" should read -- water-insoluble --.

Signed and sealed this 18th day of November 1969.

(SEAL)
Attest:

Edward M. Fletcher, Jr.                      WILLIAM E. SCHUYLER, JR.
Attesting Officer                               Commissioner of Patents